US012135621B1

(12) United States Patent
Thomas et al.

(10) Patent No.: US 12,135,621 B1
(45) Date of Patent: Nov. 5, 2024

(54) DATA RELEVANCE-BASED DATA RETENTION IN DATA LAKEHOUSES

(71) Applicant: International Business Machines Corporation, Armonk, NY (US)

(72) Inventors: Binoy Thomas, Kozhikode (IN); Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/473,527

(22) Filed: Sep. 25, 2023

(51) Int. Cl.
*G06F 11/14* (2006.01)
*G06F 16/21* (2019.01)

(52) U.S. Cl.
CPC ........ *G06F 11/1469* (2013.01); *G06F 16/217* (2019.01); *G06F 2201/80* (2013.01)

(58) Field of Classification Search
CPC . G06F 11/1469; G06F 16/217; G06F 2201/80
See application file for complete search history.

(56) References Cited

U.S. PATENT DOCUMENTS

| | | | |
|---|---|---|---|
| 7,831,567 | B2 | 11/2010 | Luther et al. |
| 8,706,697 | B2 | 4/2014 | Morsi et al. |
| 9,798,490 | B1* | 10/2017 | Natanzon ............... G06F 3/0611 |
| 9,910,742 | B1* | 3/2018 | Faibish .................. G06F 3/0605 |
| 10,324,798 | B1* | 6/2019 | Natanzon ............ G06F 11/2097 |
| 11,106,539 | B2 | 8/2021 | Av et al. |
| 11,301,419 | B2 | 4/2022 | Liu et al. |
| 2005/0144189 | A1* | 6/2005 | Edwards ............... G06F 16/185 707/999.102 |
| 2007/0100950 | A1 | 5/2007 | Bornstein et al. |
| 2017/0123890 | A1* | 5/2017 | Haridas ............... G06F 11/0769 |
| 2018/0285204 | A1* | 10/2018 | Dwarampudi ...... G06F 11/3034 |
| 2020/0019558 | A1 | 1/2020 | Okorafor et al. |
| 2020/0133781 | A1* | 4/2020 | Reddy Av ........... G06F 11/1469 |
| 2021/0034571 | A1* | 2/2021 | Bedadala .............. G06F 16/134 |

(Continued)

OTHER PUBLICATIONS

Armlin, "Data Retention Policy Guide," ChaosSearch Blog, Aug. 10, 2023, 19 pages, ChaosSearch, Inc., Boston, MA, accessed Sep. 19, 2023, https://www.chaossearch.io/blog/data-retention-policy-guide.

(Continued)

*Primary Examiner* — Jorge A Casanova
(74) *Attorney, Agent, or Firm* — Yee & Associates, P.C.

(57) ABSTRACT

Data relevancy-based data retention is provided. Data is assigned to a logical data retention relevancy compartment of a plurality of logical data retention relevancy compartments in a data lakehouse. It is determined whether a data retention relevancy value of the data is greater than a data retention threshold level of a data retention policy corresponding to the logical data retention relevancy compartment storing the data. The data is transferred from a physical data storage unit corresponding to the logical data retention relevancy compartment of the plurality of logical data retention relevancy compartments in the data lakehouse to an archive in response to determining that the data retention relevancy value of the data is greater than the data retention threshold level of the data retention policy corresponding to the logical data retention relevancy compartment storing the data.

17 Claims, 4 Drawing Sheets

(56) References Cited

U.S. PATENT DOCUMENTS

| | | |
|---|---|---|
| 2021/0271685 A1 | 9/2021 | Rasheed et al. |
| 2024/0004761 A1* | 1/2024 | Bhagi ................ G06F 11/1451 |
| 2024/0007505 A1* | 1/2024 | Mohanty ................ H04L 63/20 |
| 2024/0241986 A1* | 7/2024 | Willis ................ G06F 21/6254 |

OTHER PUBLICATIONS

Dube, et al., "Cloud Data Lake: Base Solution Architecture," IBM Cloud Architecture Center, 4 pages, International Business Machines Corporation, accessed Sep. 19, 2023, https://www.ibm.com/cloud/architecture/architectures/cloud-data-lake/.

IBM, "Data lake solutions," 6 pages, International Business Machines Corporation, accessed Sep. 19, 2023, https://www.ibm.com/data-lake.

IBM, "watsonx.data," 18 pages, International Business Machines Corporation, accessed Sep. 19, 2023, https://www.ibm.com/products/watsonx-data.

IBM, "What is a data lake?," 10 pages, International Business Machines Corporation, accessed Sep. 19, 2023, https://www.ibm.com/topics/data-lake.

Kalfus, et al., "A selective data retention approach in massive databases," Omega, Apr. 2004, pp. 87-95, vol. 32, Elsevier, accessed Sep. 19, 2023, https://www.sciencedirect.com/science/article/abs/pii/S0305048303001105.

* cited by examiner

DATA RELEVANCE-BASED DATA RETENTION IN DATA LAKEHOUSES

BACKGROUND

The disclosure relates generally to data lakehouses and more specifically to data retention in a data lakehouse.

A data lakehouse is a data platform that merges aspects of data warehouses and data lakes into one data management solution. A data warehouse is more performant than a data lake, but a data warehouse can be more expensive and limited in its ability to scale. A data lake stores vast amounts of raw and unprocessed data from diverse sources, such as databases, applications, Internet of Things (IoT) devices, and the like. Unlike a data warehouse, a data lake preserves the data's original format, allowing for flexibility in data exploration and analysis.

A data lakehouse architecture combines the flexibility and scalability of a data lake with the performance capability of a data warehouse. For example, a data lakehouse organizes data using tables and schemas, which is similar to a traditional data warehouse. This structured approach provides a defined and consistent view of the data, enabling easier integration, analysis, and querying. However, unlike a traditional data warehouse, the data in a data lakehouse is not limited to structured data only. A data lakehouse can also incorporate unstructured and semi-structured data from various data sources, maintaining the flexibility of a data lake.

As a result, a data lakehouse can accelerate data processing as users no longer need to access multiple disparate data systems to complete and scale advanced analytics, such as, for example, machine learning, business intelligence, data science, and the like. A data lakehouse also ensures that users have the most complete and up-to-date data available for analytics projects.

SUMMARY

According to one illustrative embodiment, a computer-implemented method for data relevancy-based data retention is provided. A computer assigns data to a logical data retention relevancy compartment of a plurality of logical data retention relevancy compartments in a data lakehouse. The computer determines whether a data retention relevancy value of the data is greater than a data retention threshold level of a data retention policy corresponding to the logical data retention relevancy compartment storing the data. The computer transfers the data from a physical data storage unit corresponding to the logical data retention relevancy compartment of the plurality of logical data retention relevancy compartments in the data lakehouse to an archive in response to the computer determining that the data retention relevancy value of the data is greater than the data retention threshold level of the data retention policy corresponding to the logical data retention relevancy compartment storing the data. According to other illustrative embodiments, a computer system and computer program product for data relevancy-based data retention are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
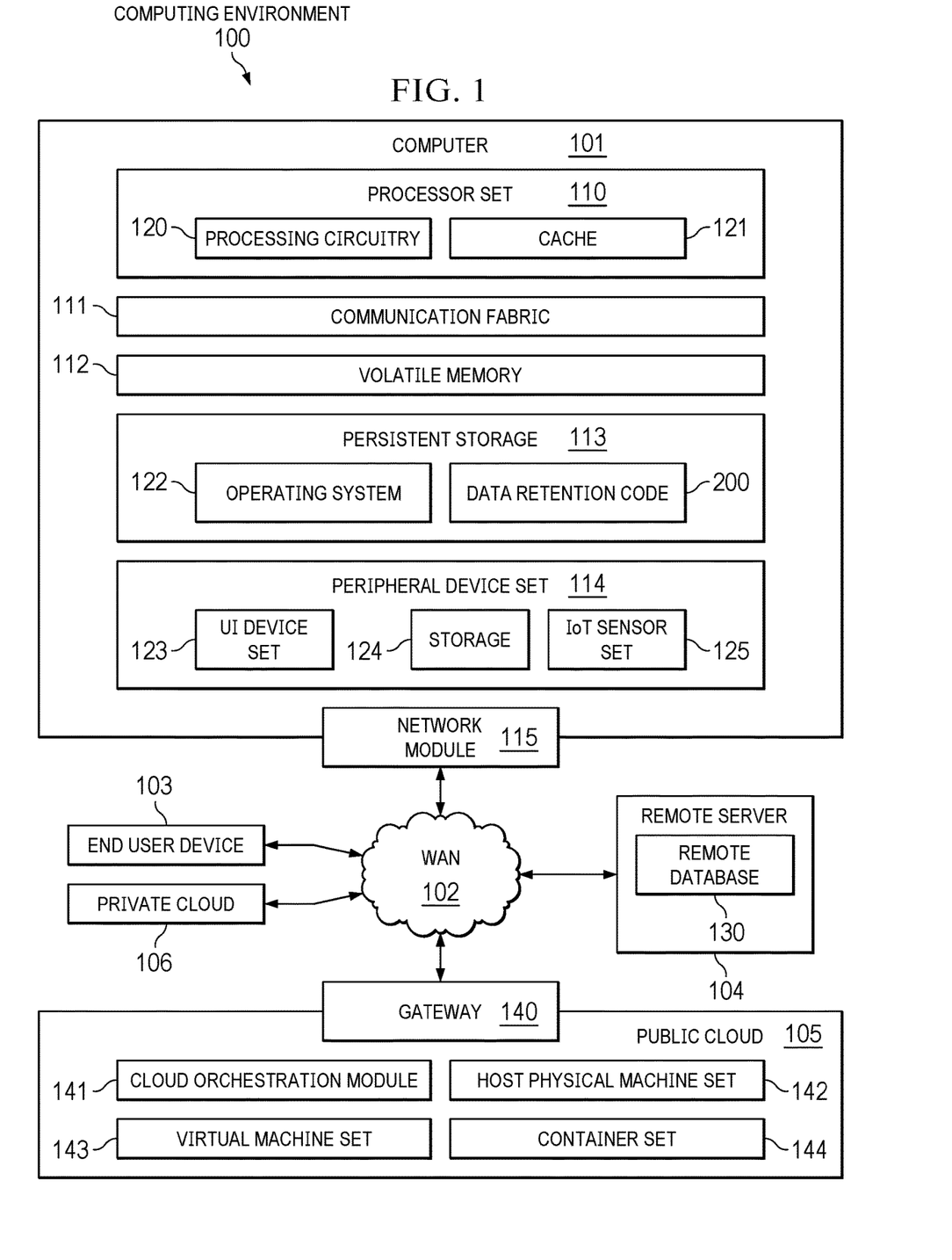
FIG. 1 is a pictorial representation of a computing environment in which illustrative embodiments may be implemented.
Figure 2:
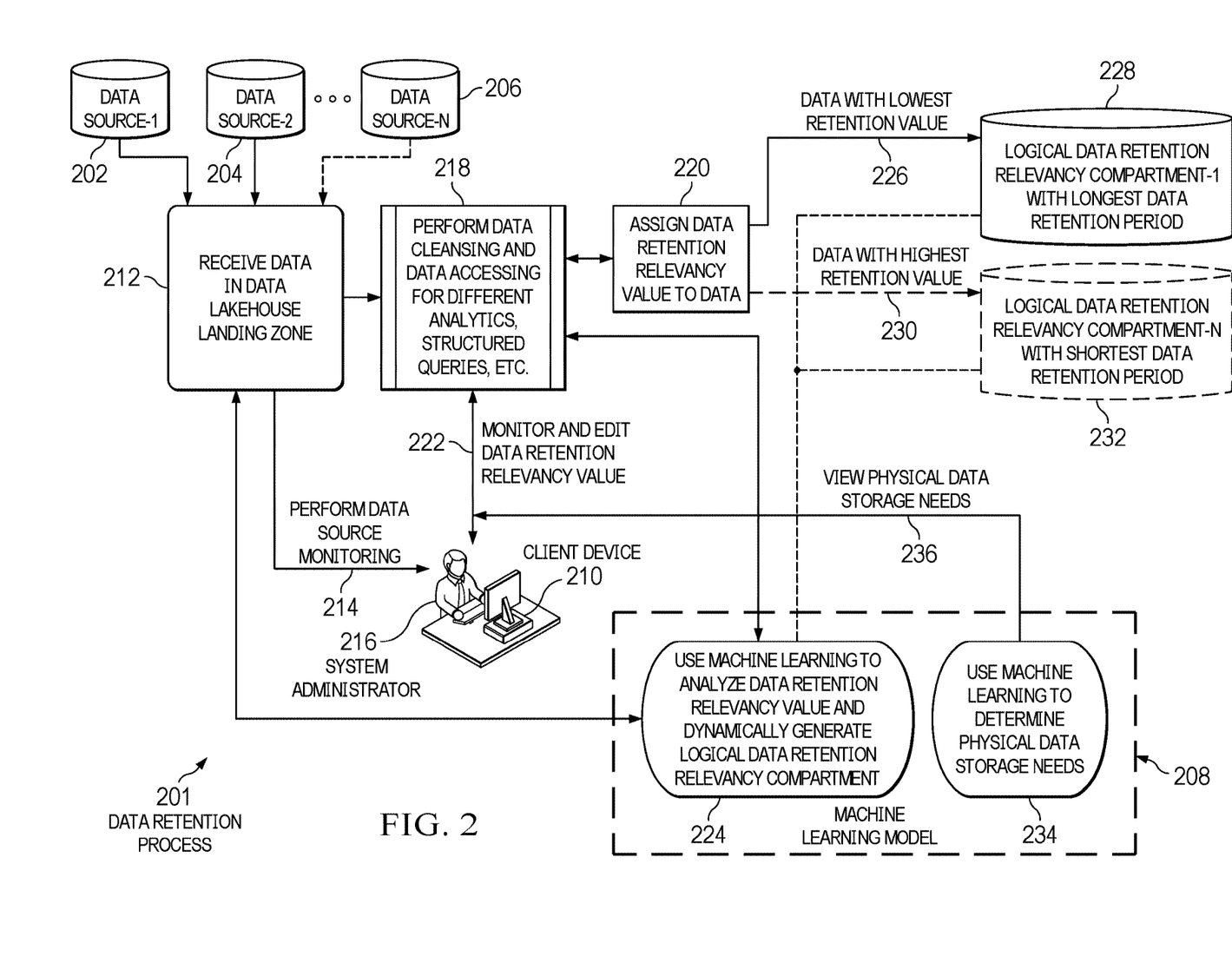
FIG. 2 is a diagram illustrating an example of a data retention process in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of a data lakehouse environment for the execution of at least some of the computer code involved in performing the inventive methods of illustrative embodiments, such as data retention code 200. For example, data retention code 200 determines data retention relevancy of data and assigns the data to a corresponding logical data retention relevancy compartment in the data lakehouse based on the determined data retention relevancy of the data. Data retention code 200 utilize data-driven decision making and machine learning to determine the data retention relevancy of the data based on, for example, query frequency of the data (i.e., number of queries accessing the data), ingestion rate of the data, ingestion time (e.g., day of the week) of the data, source of the data, repetition of the data, visibility of the data, and the like. In response to data retention code 200 determining the data retention relevancy of the data, data retention code 200 assigns a data retention relevancy value (e.g., 1 to N, where N is any positive whole number) to the data. Data retention code 200 stores the data in a data retention relevancy compartment that corresponds to the data retention relevancy value assigned to the data. However, it should be noted that a system administrator can change the data retention relevancy value corresponding to the data as needed. Also, it should be noted that the data retention relevancy compartments are logical and dynamic in nature across physical data storage units in the data lakehouse.

Data retention code 200 performs heuristic analysis of the data retention relevancy of the data and dynamically generates a corresponding data retention relevancy compartment in the data lakehouse. Based on the number of historic data queries accessing the data and the determined data retention relevancy of the data, data retention code 200 dynamically generates the corresponding data retention relevancy compartment in the data lakehouse. The corresponding data retention relevancy compartment is one of a plurality of logical data retention relevancy compartments in the data lakehouse. Each data retention relevancy compartment has a default data retention policy, which includes a data retention threshold level that can range from hours, to days, to weeks, to months, to years, based on the data retention relevancy. Data retention code 200 applies the data retention policy to a data retention relevancy compartment irrespective of physical data storage unit location in the data lakehouse. It should be noted that the data lakehouse is comprised of a plurality of physical data storage units.

When data retention code 200 detects that no data exist in a particular data retention relevancy compartment and the data retention policy threshold level of that particular data relevancy compartment is within a predefined percentage (e.g., 10%) of the data retention policy threshold level of a nearby data retention relevancy compartment, data retention code 200 merges the two data retention relevancy compartments into one data retention relevancy compartment. If data retention code 200 determines that particular data have a zero or insignificant data retention relevance (e.g., data that is not used or queried for a defined period of time), then data retention code 200 immediately archives that particular data. In addition, data retention code 200 restores that particular data from the archive to its original physical data storage unit location in response to a query targeting that particular data. Data retention code 200 utilizes the physical data storage restore frequency to predict physical data storage needs of the data lakehouse.

In addition to data retention code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and data retention code 200, as identified above), peripheral device set 114 (including user interface (UI) device set 123, storage 124, and IoT sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in data retention code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like.

Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a system administrator of an entity that operates computer 101), and may take any of the forms discussed above in connection with computer 101. EUD 103 typically receives helpful and useful data from the operations of computer 101. For example, in a hypothetical case where computer 101 is designed to provide a data retention recommendation to the end user, this recommendation would typically be communicated from network module 115 of computer 101 through WAN 102 to EUD 103. In this way, EUD 103 can display, or otherwise present, the data retention recommendation to the end user. In some embodiments, EUD 103 may be a client device, such as thin client, heavy client, mainframe computer, desktop computer, laptop computer, tablet computer, smart phone, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a data retention recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

A data lake is a centralized location where a large amount of data is stored in its native raw format. Compared to a hierarchical data warehouse, which stores data in files or folders in a structured format, a data lake uses a flat architecture and object storage to store the data. A data lake can store both raw and transformed data, from a variety of data sources, in any format.

However, utilizing a data lake as a landing zone for large quantities of data can present certain issues, such as, for example, legal obligations regarding data retention, performance issues, cloud costs, data that become obsolete after a specified time, data that lead to sample bias, data cleansing needs, maintaining data in costly physical storage such as a database for analytics, and the like, with regard to retention of the data in the data lake. For example, applying conventional data retention policies to large amounts of data from a myriad of data sources is not possible in a data lake context, as individual data sources have their own data retention policies. Also, estimating physical data storage needs in a data lake is challenging. As a result, illustrative embodiments utilize a data lakehouse, which combines the flexibility and scalability of a data lake with the performance of a data warehouse. It should be noted that illustrative embodiments implement the data lakehouse in a cloud environment.

Illustrative embodiments generate data retention policies for a data lakehouse based on data retention relevance of data. Thus, illustrative embodiments utilize data-driven decision making in the context of data retention in the data lakehouse and predict physical data storage unit needs for the data lakehouse. For example, illustrative embodiments determine the data retention relevancy of a particular set of data, assign a data retention relevancy value to that particular set of data based on the determined data retention relevancy of that particular set of data, and then assign that particular set of data to a logical data retention relevancy compartment that has a data retention relevancy policy, which corresponds to the data retention relevancy value assigned to that particular set of data, in the data lakehouse.

Initially, illustrative embodiments assign a default data retention time period (e.g., a 30 day data retention relevancy value) to all ingested data landing in the data lakehouse. Illustrative embodiments perform a heuristic analysis of the ingested data to learn data retention relevancy for each particular dataset. The heuristic analysis includes, for example, the query frequency of that particular dataset, source of that particular dataset, ingestion time (e.g., day of the week) of that particular dataset, and the like. Illustrative embodiments can utilize multiple techniques, such as, for example, data-driven decision making, machine learning, and the like, to determine the retention relevancy of the data based on, for example, data deviation, repetition of data, and the like.

Based on determining the data retention relevancy of the data, illustrative embodiments assign a data retention relevancy value (e.g., 1 to N) to the data. The data retention relevancy value corresponds to the determined data retention relevancy of the data. For example, if the data retention relevancy values are 1-100 and if the assigned data retention relevancy value is 1 for the data, then the retention time for that data in the data lakehouse is the longest data retention time. Alternatively, if the assigned data retention relevancy value is 100 for the data, then the retention time for that data in the data lakehouse is the shortest data retention time. It should be noted that a system administrator can review assigned data retention relevancy values, and if needed, the system administrator can modify one or more of the assigned data retention relevancy values to a more appropriate value. The system administrator can adjust a data retention relevancy value assigned to data either up or down based on, for example, a regulatory requirement or legal obligation for retention duration of that particular data. Based on the assigned data retention relevancy value corresponding to the data, illustrative embodiments place the data in a corresponding data retention relevancy compartment that has a data retention policy associated with the assigned data retention relevancy value of the data. The data retention relevancy compartments of the data lakehouse are logical compartments across physical data storage units and are dynamic in nature.

Based on the number of historic data queries accessing different datasets and the determined data retention relevancy of the different datasets, illustrative embodiments dynamically generate a plurality of logical data retention relevancy compartments in the data lakehouse. Each logical data retention relevancy compartment has a default data retention policy, which can range from hours to years, based on the data retention relevancy. Illustrative embodiments apply the data retention policy to a data retention relevancy compartment irrespective of physical data storage unit locations in the data lakehouse. It should be noted that illustrative embodiments can generate an appropriate data retention policy for data and generate new data retention relevancy compartments as needed. Also, it should be noted that the data lakehouse is comprised of a plurality of data storage units in a cloud environment.

In response to illustrative embodiments determining that no data exist in a data retention relevancy compartment and the data retention threshold level of the data retention policy of that particular data relevancy compartment is within a predefined percentage of the data retention policy threshold level of a nearby data retention relevancy compartment, illustrative embodiments merge the two data retention relevancy compartments into one data retention relevancy compartment. In addition, in response to illustrative embodiments determining that certain data in the data lakehouse have a zero or near zero data retention relevancy (e.g., data that is not used or queried for a defined period of time), illustrative embodiments move that data to an archive. It should be noted that the system administrator can send data to the archive directly. Further, after a data retention threshold level of a data retention policy corresponding to a data retention relevancy compartment has been exceeded, illustrative embodiments archive all of the data in that particular data retention relevancy compartment.

For example, data collected from multiple data sources (e.g., satellites, planes, IoT devices, and the like) to generate a weather report will have short data retention relevancy. After illustrative embodiments generate the weather report, the collected data is no longer relevant as illustrative embodiments perform statistical analysis on the weather report rather than the collected data and illustrative embodiments will base any new weather report on a new set of collected data. Illustrative embodiments archive the collected data once illustrative embodiments generate the weather report. However, financial data can have relevancy for an entire quarter (i.e., a three month period) until illustrative embodiments generate a quarterly financial report. Illustrative embodiments may archive the financial data, but when a user queries the archived financial data, illustrative embodiments restore the archived financial data and utilize machine learning to identify this kind of data restore sequence from the archive to physical data storage to optimize data retention policies for data retention relevancy compartments and physical data storage needs. Thus, illustrative embodiments optimize data storage space.

Illustrative embodiments restore the data from the archive to its original physical data storage location and original data retention relevancy compartment in response to a query targeting that particular data. For example, illustrative embodiments respond to queries to archived data with an "IN PROGRESS" response and restore the archived data to the original physical storage location and data retention relevancy compartment in the data lakehouse.

Illustrative embodiments utilize the physical data storage restore frequency to predict the physical data storage needs of the data lakehouse. For example, when illustrative embodiments determine that more data is being ingested into the data lakehouse than is being archived, illustrative embodiments determine that more physical data storage units are needed for the data lakehouse. Illustrative embodiments can automatically allocate more physical data storage units for the data lakehouse from the cloud environment. Moreover, illustrative embodiments can notify the system administrator regarding unused or extra physical data storage units that can incur unnecessary cost.

As part of data management by illustrative embodiments, illustrative embodiments can store data from the same data source or data having the same data retention relevancy in different physical data storage locations. For example, illustrative embodiments can place a portion of the data from an entity (e.g., enterprise, company, business, organization, institution, agency, or the like) in an object store and place another portion of the data in a time series database for different analytics. However, it should be noted that both types of the data can have the same data retention relevancy in the context of data retention. By illustrative embodiments assigning data retention relevancy values to the data, illustrative embodiments can aggregate same or similar data to the same logical data retention relevancy compartment (i.e., illustrative embodiments can place data having the same data retention relevancy value in a corresponding data retention relevancy compartment having a data retention policy that is associated with that data retention relevancy value). Hence, the data retention relevancy compartments in the data lakehouse are logical across the physical data storage units. By maintaining data in an accessible physical data storage unit location able to be queried within minimum possible time and moving the data to the archive when the data retention period has been exceeded, illustrative embodiments increase data security.

Thus, illustrative embodiments provide one or more technical solutions that overcome a technical problem with an inability of current solutions to determine how long data should be retained in physical data storage of a data lakehouse. As a result, these one or more technical solutions provide a technical effect and practical application in the field of data lakehouses.

With reference now to FIG. 2, a diagram illustrating an example of a data retention process is depicted in accordance with an illustrative embodiment. Data retention process 201 may be implemented in a data lakehouse environment, such as computing environment 100 in FIG. 1. Data retention process 201 utilizes a system of hardware and software components for data relevancy-based data retention in the data lakehouse.

In this example, data retention process 201 includes data source-1 202 and data source-2 204 to data source-N 206. Data source-1 202, data source-2 204, and data source-N 206 may be, for example, host physical machine set 142 in FIG. 1. Data source-1 202, data source-2 204, and data source-N 206 may contain any type of data corresponding to any type of data domain in a structured data format, an unstructured data format, or a semi-structured data format.

Data retention process 201 also includes machine learning model 208 and client device 210. Machine learning model 208 may be implemented in, for example, data retention code 200 in FIG. 1. Client device 210 may be, for example, EUD 103 in FIG. 1.

At 212, data retention process 201 receives data in a landing zone of the data lakehouse. The landing zone is a computer, such as, for example, computer 101 in FIG. 1. At 214, system administrator 216 utilizes client device 210 to perform data source monitoring of the data received in the computer landing zone of the data lakehouse.

At 218, the computer performs data cleansing and data accessing for different analytics, structured queries, and the like. At 220, the computer assigns a data retention relevancy value to the data. At 222, system administrator 216 monitors and edits, if needed, the data retention relevancy value assigned to the data via client device 210. At 224, the computer utilizes machine learning of machine learning model 208 to analyze the data retention relevancy value and dynamically generates a logical data retention relevancy compartment corresponding to the data retention relevancy value in the data lakehouse.

At 226, the computer assigns data with the lowest retention value (e.g., 1) to logical data retention relevancy compartment-1 228, which has the longest data retention period. At 230, the computer assigns data with the highest retention value (e.g., 100) to logical data retention relevancy compartment-N 232, which has the shortest data retention period.

At 234, the computer utilizes the machine learning of machine learning model 208 to determine the physical data storage needs of the data lakehouse. At 236, system administrator 216 views the physical data storage needs of the data lakehouse via client device 210.

Figure 3A:
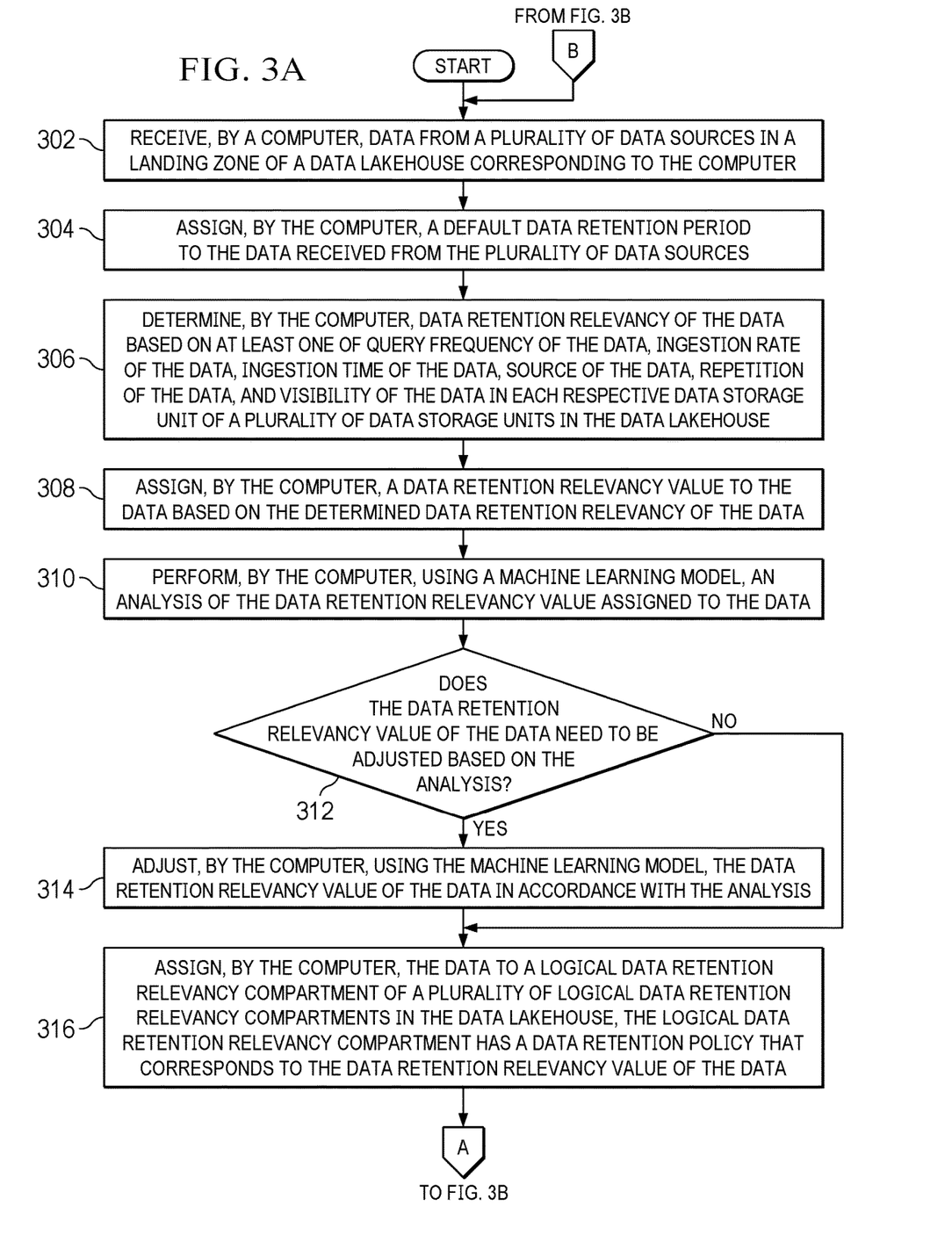
FIGS. 3A-3B are a flowchart illustrating a process for data relevancy-based data retention in a data lakehouse in accordance with an illustrative embodiment.
Figure 3B:
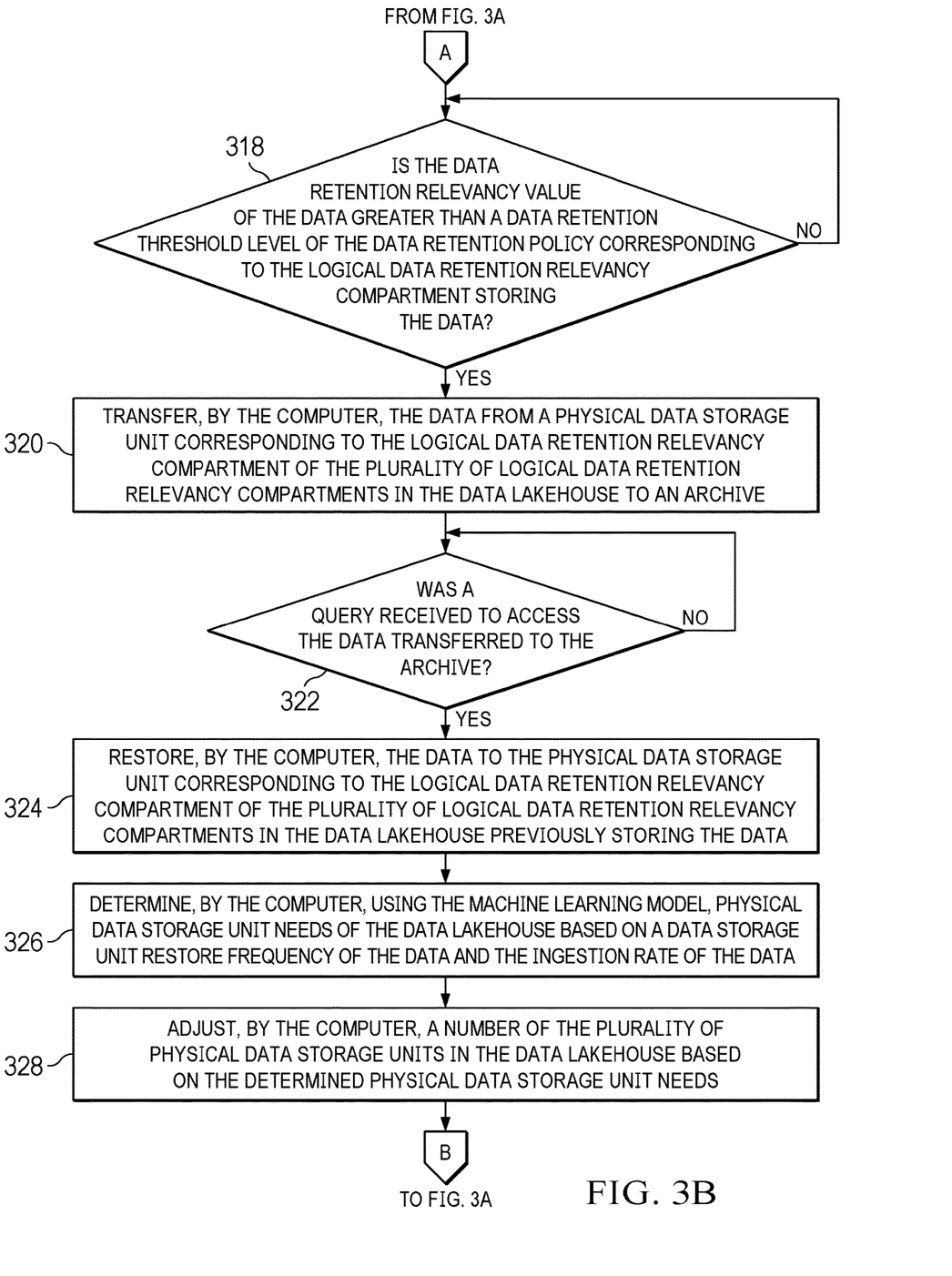

With reference now to FIGS. 3A-3B, a flowchart illustrating a process for data relevancy-based data retention in a data lakehouse is shown in accordance with an illustrative embodiment. The process shown in FIGS. 3A-3B may be implemented in a computer, such as, for example, computer 101 in FIG. 1. For example, the process shown in FIGS. 3A-3B may be implemented in data retention code 200 in FIG. 1.

The process begins when the computer receives data from a plurality of data sources in a landing zone of a data lakehouse corresponding to the computer (step 302). The computer assigns a default data retention period to the data received from the plurality of data sources (step 304).

The computer determines data retention relevancy of the data based on at least one of query frequency of the data, ingestion rate of the data, ingestion time of the data, source of the data, repetition of the data, and visibility of the data in each respective data storage unit of a plurality of data storage units in the data lakehouse (step 306). The computer assigns a data retention relevancy value to the data based on the determined data retention relevancy of the data (step 308). The computer, using a machine learning model, performs an analysis of the data retention relevancy value assigned to the data (step 310).

The computer, using the machine learning model, makes a determination as to whether the data retention relevancy value of the data needs to be adjusted based on the analysis (step 312). If the computer, using the machine learning model, determines that the data retention relevancy value of the data does need to be adjusted based on the analysis, yes output of step 312, then the computer, using the machine learning model, adjusts the data retention relevancy value of the data in accordance with the analysis (step 314). Thereafter, the process proceeds to step 316. If the computer, using the machine learning model, determines that the data retention relevancy value of the data does not need to be adjusted based on the analysis, no output of step 312, then the computer assigns the data to a logical data retention relevancy compartment of a plurality of logical data retention relevancy compartments in the data lakehouse (step 316). The logical data retention relevancy compartment has a data retention policy that corresponds to the data retention relevancy value of the data.

Subsequently, the computer makes a determination as to whether the data retention relevancy value of the data is greater than a data retention threshold level of the data retention policy corresponding to the logical data retention relevancy compartment storing the data (step 318). If the computer determines that the data retention relevancy value of the data is not greater than the data retention threshold level of the data retention policy corresponding to the logical data retention relevancy compartment storing the data, no output of step 318, then the process returns to step 318 where the computer continues to check whether the data retention relevancy value of the data is greater than the data retention threshold level. If the computer determines that the data retention relevancy value of the data is greater than the data retention threshold level of the data retention policy corresponding to the logical data retention relevancy compartment storing the data, yes output of step 318, then the computer transfers the data from a physical data storage unit corresponding to the logical data retention relevancy compartment of the plurality of logical data retention relevancy compartments in the data lakehouse to an archive (step 320).

Afterward, the computer makes a determination as to whether a query was received to access the data transferred to the archive (step 322). If the computer determines that no query was received to access the data transferred to the archive, no output of step 322, then the process returns to step 322 where the computer continues to check whether a query was received to access the data. If the computer determines that a query was received to access the data transferred to the archive, yes output of step 322, then the computer restores the data to the physical data storage unit corresponding to the logical data retention relevancy compartment of the plurality of logical data retention relevancy compartments in the data lakehouse previously storing the data (step 324).

In addition, the computer, using the machine learning model, determines physical data storage unit needs of the data lakehouse based on a data storage unit restore frequency of the data and the ingestion rate of the data (step 326). The computer adjusts a number of the plurality of physical data storage units in the data lakehouse based on the determined physical data storage unit needs of the data lakehouse (step 328). Thereafter, the process returns to step 302 where the computer continues to receive data from the plurality of data sources.

Thus, illustrative embodiments of the present disclosure provide a computer-implemented method, computer system, and computer program product for data relevancy-based data retention in a data lakehouse. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for data relevancy-based data retention, the computer-implemented method comprising:
performing, by a computer, using a machine learning model, an analysis of a data retention relevancy value assigned to data;
determining, by the computer, using the machine learning model, whether the data retention relevancy value of the data needs to be adjusted based on the analysis;
adjusting, by the computer, using the machine learning model, the data retention relevancy value of the data in accordance with the analysis in response to the computer, using the machine learning model, determining that the data retention relevancy value of the data does need to be adjusted based on the analysis;
assigning, by the computer, the data to a logical data retention relevancy compartment of a plurality of logical data retention relevancy compartments in a data lakehouse;
determining, by the computer, whether the data retention relevancy value of the data is greater than a data retention threshold level of a data retention policy corresponding to the logical data retention relevancy compartment storing the data; and
transferring, by the computer, the data from a physical data storage unit corresponding to the logical data retention relevancy compartment of the plurality of logical data retention relevancy compartments in the data lakehouse to an archive in response to the computer determining that the data retention relevancy value of the data is greater than the data retention threshold level of the data retention policy corresponding to the logical data retention relevancy compartment storing the data.

2. The computer-implemented method of claim 1, further comprising:
determining, by the computer, whether a query was received to access the data transferred to the archive; and
restoring, by the computer, the data to the physical data storage unit corresponding to the logical data retention relevancy compartment of the plurality of logical data retention relevancy compartments in the data lakehouse previously storing the data in response to the computer determining that a query was received to access the data transferred to the archive.

3. The computer-implemented method of claim 1, further comprising:
determining, by the computer, using a machine learning model, physical data storage unit needs of the data lakehouse based on a data storage unit restore frequency of the data and an ingestion rate of the data; and
adjusting, by the computer, a number of a plurality of physical data storage units in the data lakehouse based on the physical data storage unit needs of the data lakehouse.

4. The computer-implemented method of claim 1, further comprising:
determining, by the computer, data retention relevancy of the data based on at least one of query frequency of the data, ingestion rate of the data, ingestion time of the data, source of the data, repetition of the data, and visibility of the data in each respective data storage unit of a plurality of data storage units in the data lakehouse; and
assigning, by the computer, the data retention relevancy value to the data based on the data retention relevancy of the data.

5. The computer-implemented method of claim 1, further comprising:
receiving, by the computer, the data from a plurality of data sources in a landing zone of the data lakehouse corresponding to the computer; and
assigning, by the computer, a default data retention period to the data received from the plurality of data sources.

6. The computer-implemented method of claim 1, wherein the logical data retention relevancy compartment has a data retention policy that corresponds to the data retention relevancy value of the data.

7. A computer system for data relevancy-based data retention, the computer system comprising:
a communication fabric;
a storage device connected to the communication fabric, wherein the storage device stores program instructions; and
a processor connected to the communication fabric, wherein the processor executes the program instructions to:
perform, using a machine learning model, an analysis of a data retention relevancy value assigned to data;
determine, using the machine learning model, whether the data retention relevancy value of the data needs to be adjusted based on the analysis;
adjust, using the machine learning model, the data retention relevancy value of the data in accordance with the analysis in response to determining, using the machine learning model, that the data retention relevancy value of the data does need to be adjusted based on the analysis;
assign the data to a logical data retention relevancy compartment of a plurality of logical data retention relevancy compartments in a data lakehouse;
determine whether the data retention relevancy value of the data is greater than a data retention threshold level of a data retention policy corresponding to the logical data retention relevancy compartment storing the data; and
transfer the data from a physical data storage unit corresponding to the logical data retention relevancy compartment of the plurality of logical data retention relevancy compartments in the data lakehouse to an archive in response to determining that the data retention relevancy value of the data is greater than the data retention threshold level of the data retention policy corresponding to the logical data retention relevancy compartment storing the data.

8. The computer system of claim 7, wherein the processor further executes the program instructions to:
determine whether a query was received to access the data transferred to the archive; and
restore the data to the physical data storage unit corresponding to the logical data retention relevancy compartment of the plurality of logical data retention relevancy compartments in the data lakehouse previously storing the data in response to determining that a query was received to access the data transferred to the archive.

9. The computer system of claim 7, wherein the processor further executes the program instructions to:
 determine, using a machine learning model, physical data storage unit needs of the data lakehouse based on a data storage unit restore frequency of the data and an ingestion rate of the data; and
 adjust a number of a plurality of physical data storage units in the data lakehouse based on the physical data storage unit needs of the data lakehouse.

10. The computer system of claim 7, wherein the processor further executes the program instructions to:
 determine data retention relevancy of the data based on at least one of query frequency of the data, ingestion rate of the data, ingestion time of the data, source of the data, repetition of the data, and visibility of the data in each respective data storage unit of a plurality of data storage units in the data lakehouse; and
 assign the data retention relevancy value to the data based on the data retention relevancy of the data.

11. The computer system of claim 7, wherein the processor further executes the program instructions to:
 receive the data from a plurality of data sources in a landing zone of the data lakehouse corresponding to the computer system; and
 assign a default data retention period to the data received from the plurality of data sources.

12. A computer program product for data relevancy-based data retention, the computer program product comprising a computer-readable storage medium having program instructions embodied therewith, the program instructions executable by a computer to cause the computer to:
 perform, using a machine learning model, an analysis of a data retention relevancy value assigned to data;
 determine, using the machine learning model, whether the data retention relevancy value of the data needs to be adjusted based on the analysis;
 adjust, using the machine learning model, the data retention relevancy value of the data in accordance with the analysis in response to determining, using the machine learning model, that the data retention relevancy value of the data does need to be adjusted based on the analysis;
 assign the data to a logical data retention relevancy compartment of a plurality of logical data retention relevancy compartments in a data lakehouse;
 determine whether the data retention relevancy value of the data is greater than a data retention threshold level of a data retention policy corresponding to the logical data retention relevancy compartment storing the data; and
 transfer the data from a physical data storage unit corresponding to the logical data retention relevancy compartment of the plurality of logical data retention relevancy compartments in the data lakehouse to an archive in response to determining that the data retention relevancy value of the data is greater than the data retention threshold level of the data retention policy corresponding to the logical data retention relevancy compartment storing the data.

13. The computer program product of claim 12, wherein the program instructions further cause the computer to:
 determine whether a query was received to access the data transferred to the archive; and
 restore the data to the physical data storage unit corresponding to the logical data retention relevancy compartment of the plurality of logical data retention relevancy compartments in the data lakehouse previously storing the data in response to determining that a query was received to access the data transferred to the archive.

14. The computer program product of claim 12, wherein the program instructions further cause the computer to:
 determine, using a machine learning model, physical data storage unit needs of the data lakehouse based on a data storage unit restore frequency of the data and an ingestion rate of the data; and
 adjust a number of a plurality of physical data storage units in the data lakehouse based on the physical data storage unit needs of the data lakehouse.

15. The computer program product of claim 12, wherein the program instructions further cause the computer to:
 determine data retention relevancy of the data based on at least one of query frequency of the data, ingestion rate of the data, ingestion time of the data, source of the data, repetition of the data, and visibility of the data in each respective data storage unit of a plurality of data storage units in the data lakehouse; and
 assign the data retention relevancy value to the data based on the data retention relevancy of the data.

16. The computer program product of claim 12, wherein the program instructions further cause the computer to:
 receive the data from a plurality of data sources in a landing zone of the data lakehouse corresponding to the computer; and
 assign a default data retention period to the data received from the plurality of data sources.

17. The computer program product of claim 12, wherein the logical data retention relevancy compartment has a data retention policy that corresponds to the data retention relevancy value of the data.

* * * * *